July 6, 1937.  A. D. TAYLOR  2,086,055
SPRAYING APPARATUS
Filed Aug. 31, 1935

INVENTOR.
Angus Donald Taylor
BY Lyon & Lyon
ATTORNEYS

Patented July 6, 1937

2,086,055

UNITED STATES PATENT OFFICE 2,086,055

SPRAYING APPARATUS

Angus Donald Taylor, Rochelle, Ill., assignor to California Packing Corporation, San Francisco, Calif., a corporation of New York Application August 31, 1935, Serial No. 38,717

2 Claims. (Cl. 299—29)

This invention relates to an apparatus particularly adapted for use in treating field crops, such as peas and the like, with an insecticide whereby insectary pests may be controlled and/or effectively eradicated.

The control of insectary pests in field crops presents a problem of long standing. It is necessary to apply insecticides over a large acreage within a short period of time and the application in order to be worth while, should result in an efficient kill. Moreover, the application often needs be made under adverse weather conditions.

Heretofore, the treatment of field crops has not been satisfactorily accomplished as the above requirements could not be simultaneously attained. For example, it was only possible to move the spraying devices of the prior art over a field crop at the rate of about two miles an hour if it was desired to obtain a kill of more than 50%. When the treatment was conducted under adverse weather conditions, such as are encountered when wind of any velocity exists, a kill of even 50% could not be attained.

The present invention is directed to an apparatus particularly adapted for use in the treatment of field crops with a contact insecticide or the like and is particularly directed to the control of aphis and similar insectary pests.

Generally stated, the invention is directed to an apparatus which comprises a wheel vehicle carrying a reservoir of insecticide and associated with a framework extending in a direction transverse to the direction of the vehicle. The framework is provided with downwardly dependent side members enclosing a plurality of spray heads supplied with insecticide from the reservoir. As the vehicle and its accompanying framework travel across a field, the spray delivered by the heads is retained within the housing composed of such framework and the framework side members and the like, whereby efficient contact between the insecticide and the field crop is attained.

An object of this invention, therefore, is to disclose and provide an apparatus particularly adapted for the treatment of insectary pests in field crops.

Another object is to disclose and provide means whereby field crops may be rapidly and effectively treated for the eradication of insectary pests without loss of insecticides or other treating agents.

Other objects, uses and advantages of this invention will become apparent to those skilled in the art from the following detailed description, reference being had to the appended drawing for the purpose of illustrating a preferred form of the invention.

Figure 1:
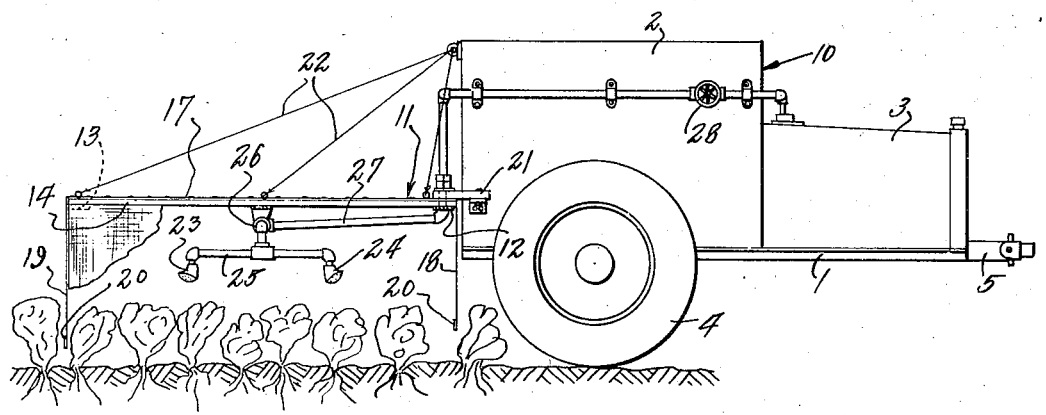
Fig. 1 represents a side elevation of one form of apparatus embraced by this invention.
Figure 2:
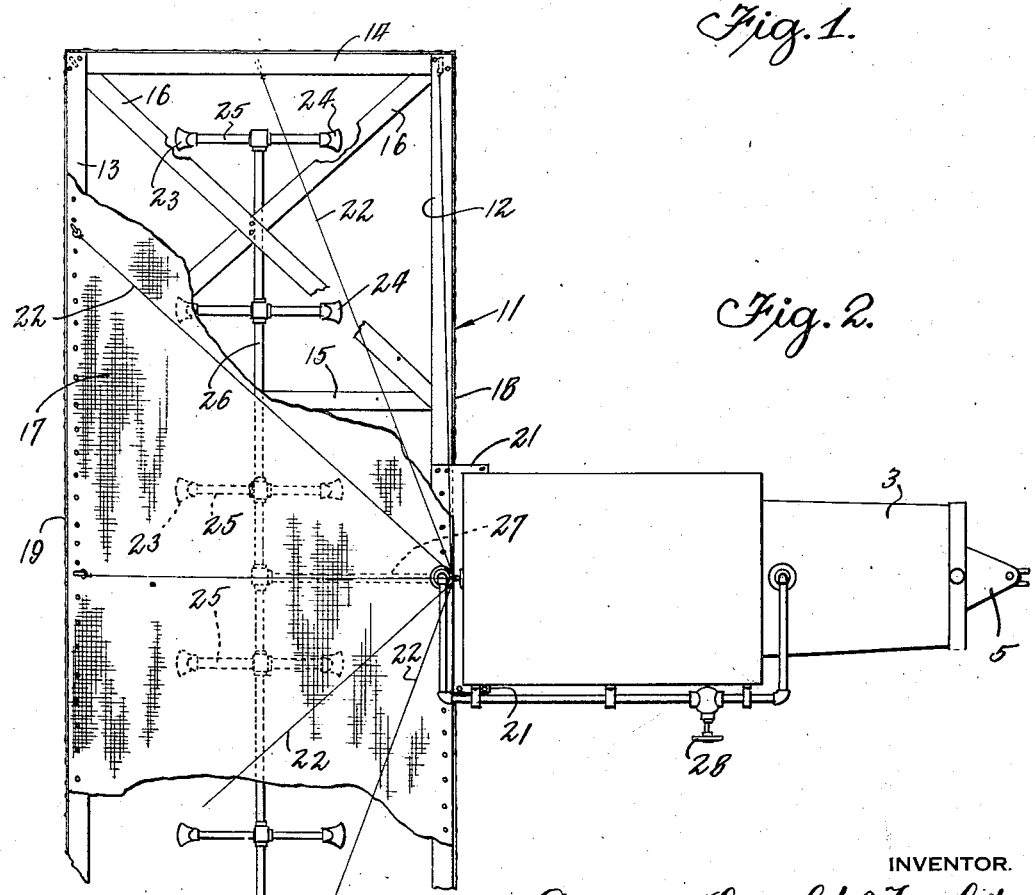
Fig. 2 is a plan view, partly broken away, of the apparatus shown in Fig. 1.

As shown in the drawing, the apparatus of this invention may include a wheeled vehicle generally indicated at 10 including a suitable frame 1, a reservoir for insecticide, such as the tank 2, and a housing 3 containing a suitable motor and pump or the like. The vehicle may be provided with large rubber-tired wheels, indicated at 4. A tongue, by means of which the vehicle 10 may be drawn by a tractor or the like, is indicated at 5. It is to be understood that if desired the housing 3 may include a pump which is driven directly from the tractor or other power-driven vehicle pulling the trailer 10 by means of a flexible drive shaft or drive shaft and universal couplings. The pump is not shown as any suitable type of pump connected in the customary manner with the interior of the reservoir and provided with a discharge outlet, may be employed.

Associated with the vehicle 10 and in the rear thereof is a framework, generally indicated at 11, this framework extending in a direction transverse to the direction of the trailer 10. The framework may include longitudinal members 12 and 13 at the front and rear respectively, end members 14 and suitable intermediate transverse members 15. Diagonal braces 16 may also be provided. The entire framework is provided with a cover of suitable light-weight material such as, for example, substantially impervious waterproof cloth or canvas indicated at 17.

The framework 11 is provided with downwardly dependent front and rear members, such as the members 18 and 19. These members 18 and 19 are preferably of a flexible and limp material such as cloth, and may be provided with slats or other weight members 20. The front downwardly depending member 18 should be shorter than the rear member, although both of the members should clear the ground.

The entire framework, including its front and rear members, is attached to the vehicle 10 as, for example, by means of the members 21 and wire chain or rope stays 22.

Below the top 17 of the framework 11 and between the front and rear members 18 and 19 a plurality of pairs of spray heads 23 and 24 is positioned. The spray heads 23 and 24 may be carried by transverse conduit members 25 connected to a longitudinally extending manifold 26 attached to the framework 11 in any suitable manner. The manifold 26 is connected by conduit means 27 with the discharge outlet of the pump in housing 3. The conduit 27 is preferably provided with a suitable valve 28.

Attention is called to the fact that the spray heads 23 and 24 are oppositely directed, the spray heads 23 being directed toward the rear whereas the spray heads 24 are directed toward the front. Pairs of spray heads are preferably spaced a distance of from about 12 to 36 inches, the spray heads of each pair being separated a distance of from about 8 to 16 inches.

In a typical device of the character described hereinabove, the framework 11 was 33 feet long and 5½ feet wide, the front member 18 being 26 inches long whereas the rear member 19 was 28 inches long. In the housing thus formed, the spray nozzles of each pair were positioned 12 inches apart, the rear nozzle being about 24 inches from the rear member 19 when said member was in a vertical position. The lower edge of the rear member was approximately 6 inches from the ground.

It has been found that with an apparatus of the character described hereinabove, aphis and other insectary pests may be readily controlled by spraying the field crops with contact insecticides such as nicotine solutions and the like. Moreover, it is possible to treat a large acreage within a relatively short time. Ordinary dry dusting machines and spraying machines need travel at a rate of only about two miles per hour whereas the apparatus of this invention may travel at a rate of from four to eight miles an hour and obtain an almost complete kill. The ability to treat large acreage quickly is of paramount importance as time is very essential in the control of insectary pests because upon infestation any control must take place in a short space of time. Moreover, because of the high capacity of the machines, only a small investment in machines is necessary.

By arranging the front member 18 so that it is shorter than the rear member 19, the plants are not impeded in entering the housing. The rear housing, however, drags along the plants, bending them toward the rear spray head 23, insuring application of the spray to all portions of the plant.

It is to be understood that the ends of the frame 11 may also be provided with downwardly extending limp and flexible flaps for the purpose of further retaining vapors within the housing during the application of the insecticides to the crops. Moreover, the entire framework 11 may be arranged for ready dismantling or folding so as to permit the apparatus to be moved along country roads without interfering with the traffic.

All changes, modifications and adaptations of the invention as may come within the scope of the appended claims are embraced thereby.

I claim:

1. An apparatus for treatment of crops with an insecticide or the like, which comprises a wheeled vehicle provided with a reservoir for insecticide, a framework associated with the rear of said vehicle and extending in a direction transverse to said vehicle, said framework being provided with a top and downwardly depending front and rear members, said front and rear members being limp and flexible and adapted to clear the ground, a plurality of pairs of spray heads positioned below the top of said framework, the forward head of each pair being directed to discharge forwardly and downwardly while the rear head of each pair is directed rearwardly and downwardly, the rear flexible member being sufficiently long to contact with and bend plants toward said rearwardly directed spray heads, and means for supplying insecticide to said spray heads from said reservoir whereby said vehicle may be advanced over field crops and said crops thoroughly treated with insecticide from said reservoir.

2. An apparatus for treatment of crops with an insecticide or the like, which comprises a wheeled vehicle provided with a reservoir for insecticide, a framework associated with the rear of said vehicle and extending in a direction transverse to said vehicle, said framework being provided with a top and downwardly depending, flexible front and rear members, said rear members being sufficiently long to bend plants inwardly whereas the front members are shorter than the rear members and do not impede the entrance of plants below the framework, a plurality of pairs of spray heads positioned below the top of said framework, the forward head of each pair being directed to discharge forwardly and downwardly while the rear head of each pair is directed rearwardly and downwardly, and means for supplying insecticide to said spray heads from said reservoir whereby said vehicle may be advanced over field crops and said crops thoroughly treated with insecticide from said reservoir.

ANGUS DONALD TAYLOR.